(12) United States Patent
Pruessner et al.

(10) Patent No.: US 9,759,552 B2
(45) Date of Patent: Sep. 12, 2017

(54) EVANESCENT FIELD OPTO-MECHANICAL DISPLACEMENT SENSOR

(71) Applicant: The United States of America, as represented by the Secretary of the Navy, Washington, DC (US)

(72) Inventors: Marcel W. Pruessner, Chevy Chase, MD (US); Todd H. Stievater, Arlington, VA (US); William S. Rabinovich, Silver Spring, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/168,921

(22) Filed: May 31, 2016

(65) Prior Publication Data
US 2016/0273912 A1    Sep. 22, 2016

Related U.S. Application Data

(62) Division of application No. 14/538,831, filed on Nov. 12, 2014, now Pat. No. 9,395,177.
(Continued)

(51) Int. Cl.
*G01B 9/02* (2006.01)
*G01B 11/16* (2006.01)
(Continued)

(52) U.S. Cl.
CPC ........ *G01B 11/161* (2013.01); *G01B 9/02023* (2013.01); *G01B 9/02051* (2013.01);
(Continued)

(58) Field of Classification Search
CPC ..... G01B 11/161; G01B 11/026; G01B 11/14; G01B 9/02023; G01B 9/02051; G01B 6/29335; G01D 5/35329
(Continued)

(56) References Cited

U.S. PATENT DOCUMENTS 5,455,178 A * 10/1995 Fattinger ............ G01N 21/7743
                                                        385/12
5,729,641 A *  3/1998 Chandonnet ............ G02F 1/295
                                                        385/1
(Continued)

OTHER PUBLICATIONS

L. A. Pinnaduwage, V. Boiadjiev, J. E. Hawk, and T. Thundat, "Sensitive detection of plastic explosives with self-assembled monolayer-coated microcantilevers," Appl. Phys. Lett. 83 (7), 1471-1473, Aug. 2003.
(Continued)

*Primary Examiner* — Tarifur Chowdhury
*Assistant Examiner* — Jonathon Cook
(74) *Attorney, Agent, or Firm* — US Naval Research Laboratory; Suresh Koshy

(57) ABSTRACT

A method and system described for sensing a displacement by receiving and propagating a laser light signal with an etched waveguide that is configured to enable an evanescent optical field above the waveguide surface. A movable perturber can be positioned so the perturber interacts with the evanescent optical field above the waveguide surface. An optical phase shift can be induced in the waveguide when the movable perturber is displaced in the evanescent optical field, and the optical phase shift can be measured with an optical readout circuit.

15 Claims, 6 Drawing Sheets

Related U.S. Application Data

(60) Provisional application No. 61/904,139, filed on Nov. 14, 2013.

(51) Int. Cl.
    *G01B 11/14*     (2006.01)
    *G01B 11/02*     (2006.01)
    *G01D 5/353*     (2006.01)

(52) U.S. Cl.
    CPC ............ *G01B 11/026* (2013.01); *G01B 11/14* (2013.01); *G01D 5/35329* (2013.01)

(58) Field of Classification Search
    USPC ......................................................... 356/482
    See application file for complete search history.

(56) References Cited

U.S. PATENT DOCUMENTS

| | | |
|---|---|---|
| 6,212,314 B1 * | 4/2001 | Ford .................. G02B 6/12007 385/10 |
| 6,668,111 B2 | 12/2003 | Tapalian et al. |
| 9,069,004 B2 | 6/2015 | Bhave et al. |

OTHER PUBLICATIONS

C.A.J. Putman, B.G. de Grooth, N.F. van Hulst and J. Greve, "A theoretical comparison between interferometric and optical beam deflection technique for the measurement of cantilever displacement in AFM," *Ultramicroscopy.* 42-44, 1509-1513, Aug. 1992.

T. H. Stievater, W. S. Rabinovich, M. S. Ferraro, N. A. Papanicolaou, R. Bass, J. B. Boos, J. L. Stepnowski, and R. A. McGill, "Photonic microharp chemical sensors," *Opt. Express*, 16 (4), 2423-2430, Feb. 2008.

M. W. Pruessner, N. Siwak, K. Amarnath, S. Kanakaraju, W.-H. Chuang and R. Ghodssi, "Endcoupled optical waveguide MEMS devices in the indium phosphide material system," *J. Micromech. Microeng.*, 16, 832-842, Mar. 2006.

M. W. Pruessner, K. Amarnath, M. Datta, D.P. Kelly, S. Kanakaraju, P.-T. Ho, and R. Ghodssi, "InP-based optical waveguide MEMS switches with evanescent coupling mechanism," J. Microelectromech. Syst. 14 (5), 1070-1081, Oct. 2005.

P.T. Rakich, M.A. Popovic, M.R. Watts, T. Barwicz, H.I. Smith, and E.P. Ippen, "Ultrawide tuning of photonic microcavities via evanescent field perturbation," *Optics Lett.* 31 (9) 1241-1243, May 2006.

V. T. K. Sauer, Z. Diao, M.R.Freeman, and W.K. Hiebert, "Nanophotonic detection of sidecoupled nanomechanical cantilevers," Appl. Phys. Lett. 100, 261102, Jun. 2012.

I. De Vlamincka, J. Roels, D. Taillaert, D. Van Thourhout, and R. Baets, L. Lagae and G. Borghs, "Detection of nanomechanical motion by evanescent light wave coupling," Appl. Phys. Lett. 90, 233116, Jun. 2007.

M. Li, W.H.P. Pernice, C. Xiong, T. Baehr-Jones, M. Hochberg & H.X. Tang, "Harnessing optical forces in integrated photonic circuits," Nature 456, 480-484, Nov. 2008.

M.W. Pruessner, D. Park, T.H. Stievater, and W.S. Rabinovich, "A Low Mode Confinement Integrated Waveguide Platform for High Resolution Displacement Sensing," *Proc. IEEE Sensors Conf.*, Nov. 4-6, 2013, Baltimore, MD.

Alexander Gondarenko, Jacob S. Levy and Michal Lipson, "High confinement micron-scale silicon nitride high Q ring resonator," *Optics Express* 6 (17) 11366-11370, Jun. 2009.

R. Chow, W.A. Lanford, W. KeMing, and R.S. Rosler, "Hydrogen content of a variety of plasmadeposited silicon nitrides," *J. Appl. Phys.* 53 (8) 5630-5633, Apr. 1982.

C.H. Henry, R.F. Kazarinov, H.J. Lee, K.J. Orlowsky, and L.E. Katz, "Low loss Si3N4—SiO2 optical waveguides on Si," *Appl. Opt.* 26 (13), 2621-2624, Jul. 1987.

T.H. Stievater, N. A. Papanicolaou, R. Bass, W.S. Rabinovich, R.A. McGill, "Micromechanical photothermal spectroscopy of trace gases using functionalized polymers," *Optics Lett.* 37 (12), 2328, Jun. 2012.

K. Zinoviev, C. Dominguez, J.A. Plaza, V.J.C. Busto, and L.M. Lechuga, "A Novel Optical Waveguide Microcantilever Sensor for the Detection of Nanomechanical Forces," *J. Lightwave Technol.* 24 (5) 2132-2138, May 2006.

M. Li, W. H. P. Pernice and H. X. Tang, "Broadband all-photonic transduction of nanocantilevers," *Nature Nanotech* 4, 377-382, Feb. 2009.

O. Arcizet, P.-F. Cohadon, T. Briant, M. Pinard & A. Heidmann, "Radiation-pressure cooling and optomechanical instability of a micromirror," *Nature* 444 71-74, Nov. 2006.

M.W. Pruessner, T.H. Stievater, W.S. Rabinovich, "Integrated waveguide Fabry-Perot microcavities with silicon/air Bragg mirrors," *Optics Letters* 32 (5) 535-537, Mar. 2007.

\* cited by examiner

Movable perturber covering entire spiral waveguide segment

105

EVANESCENT FIELD OPTO-MECHANICAL DISPLACEMENT SENSOR

CROSS-REFERENCE TO RELATED APPLICATIONS

This application is a divisional of patent application entitled "Evanescent Field Opto-Mechanical Phase Shifter," filed on Nov. 12, 2014 and assigned U.S. application Ser. No. 14/538,831, which claims priority to provisional patent application entitled, "Evanescent Field Opto-Mechanical Displacement Sensor," filed on Nov. 14, 2013, and assigned U.S. Application No. 61/904,139; the entire contents of which are hereby incorporated by reference.

TECHNICAL FIELD

The present disclosure relates generally to a micro-electro-mechanical systems, and more specifically, it relates to a high-resolution chip-scale displacement sensor system and a chip-scale tunable phase shifter.

BACKGROUND

Micro-electro-mechanical systems (MEMS) are chip-scale structures that can convert mechanical effects into measurable quantities, e.g. electrical or optical signals. In particular, the invention described herein pertains to opto-mechanical systems (optical MEMS) in which nanometer-level displacements are measured optically. There is a variety of current techniques that have limitations and disadvantages when compared to the present invention, which will be described.

One straightforward displacement measurement technique known in the prior art is off-chip displacement detection. In this technique, light can be focused on the tip of a cantilever. The cantilever can be coated with metal so that light can be reflected and measured with a position-sensitive photodetector, and any cantilever motion modifies the detected optical signal.

A more sensitive method for off-chip displacement detection can split the laser light into two paths: one can be the reference and the other can be the displacement signal that includes the optical path of light that reflects off the cantilever. This approach can provide high sensitivity because the reference and signal laser beams interfere and the interference is sensitive to changes in optical path length (Michelson interferometer). However, it has been found that under ideal conditions the methods described have similar displacement resolution.

The two off-chip displacement detection techniques are simple and can be implemented in a lab setting using readily available components. However, the readout mechanism requires accurate optical alignment between off-chip components (e.g. laser, photodetector) and on-chip structures (e.g. mechanical cantilever). This limits the applicability in settings outside of the lab, where accurate alignment may be difficult to achieve. Furthermore, off-chip detection may limit the ability for large-scale integration of many devices.

Another displacement measurement technique known in the prior art is on-chip displacement sensing with optical cavities. A microbridge (alternatively, a cantilever) can act as a movable mirror underneath which is placed a second fixed mirror. The mirrors can form an interferometer whose transmittance (T) and reflectance (R=1−T) are sensitive to the microbridge displacement ($\Delta z$):

$$T \propto 1/[1+(2F/\pi)^2 \sin^2(\phi/2)] \quad (1),$$

where F is the cavity finesse and the phase is $\phi = \phi_0 + 2\pi(\Delta z/\lambda)$. From equation (1) the change in transmittance can be a function of displacement and the sensitivity is increased by the F. The finesse depends on the mirror reflectivity (r) as $F = \pi r^{1/2}/(1-r) \gg 1$. In contrast, for a Michelson interferometer $F \approx 1$.

Although cavities can increase the displacement sensitivity, they have drawbacks. The fabrication of high-reflectivity mirrors is challenging, especially in an integrated chip-scale structure. High-finesse F implies a narrow optical bandwidth, which limits the operating wavelength. Furthermore, most materials are temperature-sensitive (the refractive index varies with temperature) so that the optical narrow-band operation limits the temperature range at which such a sensor can operate. Finally, most micromechanical Fabry-Perot cavities are created using an approach where the cavity is formed parallel to the wafer plane (i.e. surface-normal cavity). Although multiple sensors (microbridges or cantilevers) can be fabricated on-chip, there will be a tradeoff between the number of sensors and the cavity finesse so that compromises have to be made between large-scale integration and sensitivity.

On-chip displacement sensing using cantilever waveguides is another displacement measurement technique known in the prior art. This approach can enable large-scale integration and optical readout. A cantilever optical waveguide can function as a light guide and simultaneously as a mechanical structure. The cantilever waveguide can be initially aligned with a second fixed waveguide. As the cantilever deflects (either in-plane or out-of-plane) the amount of light that is transmitted to the second fixed waveguide is modified as equation (2):

$$\left| \int_{-\infty}^{\infty} \phi_1(x) \phi_2(x) dx \right|^2$$

where $\Phi_1(x)$ and $\Phi_2(x)$ describe the fundamental optical mode field in the cantilever and fixed waveguides, respectively. For identical input/output waveguides the deflection of the cantilever tip modifies the transmittance as $T(\Delta x) = \exp[-(\Delta x/w_0)]^2$, where $2w_0$ is the optical mode width.

This technique can enable the optical interrogation of many cantilevers and their respective displacements using a single optical input and output, since light can be guided, split, and recombined on-chip using integrated waveguides. However, the shortcoming of this approach is its limited sensitivity. When the cantilever and fixed waveguides are perfectly aligned, the displacement sensitivity is at its minimum. The peak sensitivity occurs for a slight initial misalignment ($\Delta x_0$). In practice, however, it is difficult to operate at peak sensitivity due to fabrication limitations and intrinsic stresses that result in cantilever misalignment; and even when the initial misalignment is $\Delta x_0$, this technique is typically less sensitive than interferometry. Fabrication is also challenging, since the gap between the input and output waveguides needs to be minimized to ensure low optical losses and the waveguide mode (w0) should be made small to ensure high displacement sensitivity.

Another type of on-chip displacement sensing using evanescent field sensors can take advantage of the evanescent optical field in a waveguide. The evanescent field is the component of the optical field that resides outside of the waveguide core. The evanescent field decays exponentially away from the core; and, therefore, is highly sensitive to the presence and displacement of structures brought into proximity to this field. In this embodiment, an optical switch can be formed from two suspended waveguides. By varying the gap between the waveguides using electrostatic actuation, the optical coupling via the evanescent field cab be modified. Light can then be switched between one waveguide to the other. A limitation is that the waveguides in a prior demonstration have a diameter that is much larger than the optical wavelength (width=2 µm, or approximately 4λ for $n_{CORE}$=3.2 and λ=1,550 nm), so that the evanescent field is small and large displacements (Δx≈1,000 nm) are required for switching.

In a second evanescent field device, a circular optical cavity ("microring" resonator) can form an optical filter. A dielectric slab can be brought into close proximity to the surface of the cavity so that it interacts with the evanescent optical field. The result is that the effective refractive index of the microring is increased as the dielectric perturber moves closer to the microring surface. By increasing the effective index, the filter transmission is modified and the resonance wavelengths are shifted. In principle, this structure could be used to measure displacements. However, the waveguides are still relatively large (thickness t=330 nm, or ≈λ/2 for $n_{CORE}$=2.0), which implies a modest evanescent field. Furthermore, the cavity has a narrow optical resonance line width, which makes the device optically narrowband. Consequently, the device is highly temperature sensitive and may limit the applicability of such a sensor to laboratory environments, where environmental conditions are precisely controlled.

In the prior art, other groups have demonstrated evanescent field devices and have shown displacement sensing, but the waveguides were large (width>λ for the in-plane displacement sensor in and width>λ/2 for the in-plane displacement sensor in). Such optically large structures limit the evanescent field and displacement sensitivity. Furthermore, these devices utilize silicon-on-insulator (SOI) waveguides, whose material absorption results in self-heating and buckling of the waveguide leading to displacement measurement errors. Silicon also has a large thermo-optic effect (dn/dT≈2×10$^{-4}$/° C.) that will introduce temperature-induced phase shifts, so SOI waveguides are not optimal for high-resolution sensing.

Previously, thin silicon waveguides (e.g., thickness t=110 nm, or ≈λ/4 for $n_{CORE}$=3.5 and λ=1550 nm) have been demonstrated in the prior art, and used for demonstrating optical forces and measuring displacements of a suspended silicon bridge. However, these waveguides exhibited relatively large loss (5 dB/cm) and large absorption (0.2 dB/cm) that leads to self-heating and thermo-optic phase shifts (dn/dT≈2×10$^{-4}$/° C.) that complicate any displacement measurement that relies on index perturbation. Furthermore, such thin (e.g., 110 nm) silicon waveguides are fabricated from silicon-on-insulator wafers, which are expensive compared to standard silicon wafers. Finally, the relatively large index of silicon (nSilicon≈3.5 near λ=1550 nm) requires relatively small waveguides (width<500 nm) in order to maintain the single-mode condition. This increases the need for high fabrication accuracy, which increases cost.

Accordingly, there remains a need in the art to develop a displacement sensor system with a waveguide that can enable a large evanescent field; exhibit relatively low loss; be relatively easy and cheap to manufacture; and be more suitable for field settings, in which the environmental conditions are difficult to control compared to in a lab.

SUMMARY

According to one aspect of the invention, a system is described for a displacement sensor system that includes a waveguide core deposited on top of a lower cladding. The waveguide core can include an etched waveguide that can be configured to receive and propagate light from a laser source and to enable an evanescent optical field above the waveguide surface. Furthermore, a movable perturber can be suspended above the etched waveguide and can be positioned to interact with the evanescent optical field above the waveguide surface. The evanescent field interaction can induce an optical phase shift when the movable perturber is displaced.

According to another aspect of the invention, a method is described for sensing a displacement by receiving and propagating a laser light signal with an etched waveguide that is configured to enable an evanescent optical field above the waveguide surface. A movable perturber can be positioned so the perturber interacts with the evanescent optical field above the waveguide surface. An optical phase shift can be induced in the waveguide when the movable perturber is displaced in the evanescent optical field, and the optical phase shift can be measured.

According to another aspect of the invention, a method is described for inducing optical phase shifts by receiving and propagating a laser light signal with an etched waveguide that is configured to enable an evanescent optical field above the waveguide surface. A movable perturber can be positioned so the perturber interacts with the evanescent optical field above the waveguide surface. The perturber can be actively displaced within the evanescent field to induce an optical phase shift in the waveguide. Finally, the induced optical phase shift can be utilized to achieve an optical delay.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF EXEMPLARY EMBODIMENTS

Figure 1A:
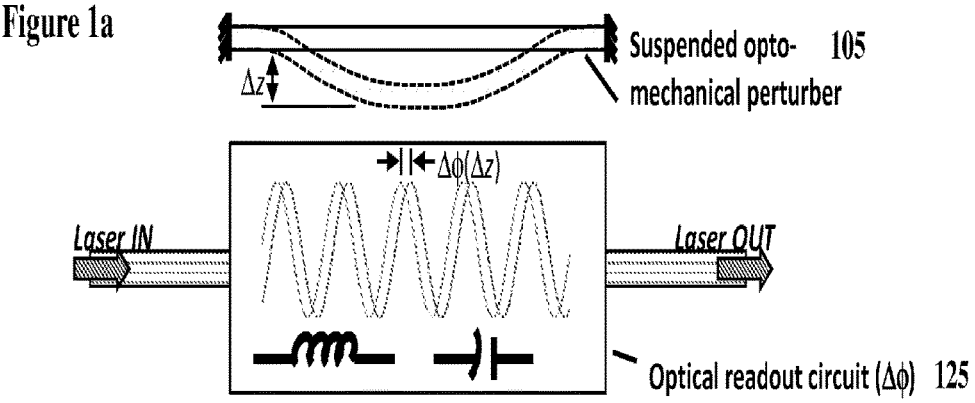
FIG. 1a is an integrated waveguide displacement sensor system with a generic optical readout circuit, in accordance with an exemplary embodiment of the invention.

One or more embodiments or implementations are hereinafter described in conjunction with the drawings, where like reference numerals refer to like elements throughout, and where the various features are not necessarily drawn to scale.

In general, this invention describes an integrated waveguide technology displacement sensor system that includes a waveguide core deposited on top of a lower cladding. The waveguide core can include an etched waveguide, or rib waveguide, that can receive and propagate a laser light signal from a laser source. The etched waveguide can enable (based on the design, shape, size, and materials used) an evanescent optical field above the waveguide surface. The displacement sensor system can also include a movable perturber that can be suspended above the etched waveguide, leaving a gap between the etched waveguide and perturber. The perturber can be positioned to interact with the evanescent optical field above the waveguide surface. When the movable perturber is displaced, the perturber can interact with the evanescent field and induce an optical phase shift. The displacement sensor system can also include an integrated optical readout circuit configured to measure the optical phase shift as the perturber interacts with the evanescent optical field. The optical phase shift can be converted into an intensity modulation by means of interferometry, which can enable the determination of the perturber displacement magnitude.

Generally, high-resolution chip-scale displacement measurements rely on interferometry, in which the relative displacement between two mirrors is measured. The advantages of the present invention compared to other methods can include simplicity (the readout can be a simple waveguide without the need for an optical cavity with high-quality mirrors), broadband operation (there is no cavity, and cavities are inherently narrow-band optically), and relative temperature insensitivity (the optical broadband nature of the sensor implies that temperature changes, which effectively tune the operating wavelength, have little effect on the sensor operation). The waveguide technology is straightforward with simple processing steps, large fabrication tolerance, and the ability to create large-scale arrays on a single chip. Finally, the sensor is passive without any electrical power required on-chip, and the readout can be performed remotely by connecting the chip to an optical source and detector via optical fibers.

Figure 1B:
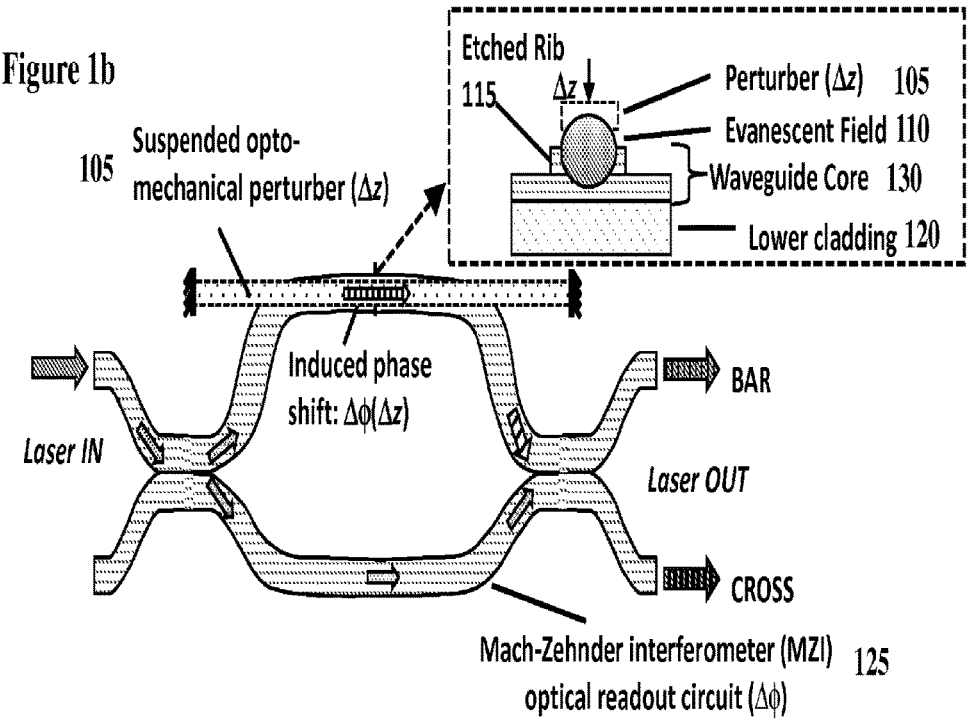
FIG. 1b is a top view of an integrated waveguide displacement sensor system with a Mach-Zehnder interferometer (MZI) optical readout circuit, in accordance with an exemplary embodiment of the invention.

FIG. 1a is an integrated waveguide displacement sensor system 100 with a generic optical readout circuit, in accordance with an exemplary embodiment of the invention. FIG. 1b is a top view of an integrated waveguide displacement sensor system 100 with a Mach-Zehnder interferometer optical readout circuit, in accordance with an exemplary embodiment of the invention. The integrated waveguide displacement sensor system 100 can enable large evanescent optical fields 110, and the light propagation characteristics can be highly sensitive to the presence and displacement of a movable optical perturber 105.

In an exemplary embodiment of the invention, an air top cladding (not labeled in Figure), can be positioned above the etched waveguide 115, and can enable access to the large evanescent optical field 110. Specifically, the air cladding can be the area above the waveguide core 130 into which the evanescent field 110 can penetrate.

In an exemplary embodiment of the invention, the integrated waveguide displacement sensor system 100 can include a shallow-etched rib waveguide 115, which can be a small step that has been etched into a thin dielectric waveguide core 130. The shallow-etched rib waveguide 115 can be configured to enable single-mode propagation with a large evanescent optical field 110 above the waveguide 115 surface. The waveguide 115 can receive and propagate light from a laser source (not pictured). The waveguide core 130 (thickness≤λ/5) can be deposited on top of a lower cladding 120, which can be a low refractive index lower cladding material 120 (e.g. SiO2) on a semiconductor wafer. The waveguide core 130 can include the entire $Si_3N_4$ layer, including the etched waveguide 115.

More specifically, the shallow-etched rib waveguide 115 can be configured to have a large lateral feature size (e.g., width≥λ), which can permit a large fabrication tolerance. The waveguide core 130 can be formed from a 175 nm thick layer of $Si_3N_4$ deposited via low-pressure chemical vapor deposition (LPCVD) on a 3,000 nm thick layer of $SiO_2$ (thermal oxide). In an exemplary embodiment of the invention, Si3N4 layers of thickness t<<175 nm are achievable. Although plasma-enhanced chemical vapor deposition (PECVD) may also be used for the $Si_3N_4$ layer, the use of LPCVD generally results in higher quality silicon nitride films with lower hydrogen content than PECVD films. Therefore, LPCVD is preferred for low-loss near-infrared (NIR) waveguides. In addition, hydrogen induces absorption near λ=1520 nm, so minimizing the hydrogen is key for broadband devices.

In an exemplary embodiment of the invention, the 175 nm thick $Si_3N_4$ layer waveguide core 130 can have a manufacturer specified refractive index $n_{Si3N4}$=2.00±0.02. The bottom cladding 120 can be $SiO_2$ (n $SiO_2$=1.456), while the top cladding can be either air, or another $SiO_2$ layer. The $Si_3N_4$ core thickness can be sub-λ/4 so that the optical mode is highly-evanescent. Confinement in-plane can be achieved by forming a shallow rib via contact lithography and etching 55 nm down into the $Si_3N_4$ core layer. In this manner, complex nanophotonic structures can be realized using simple batch processing techniques that are widely available, and known to one of ordinary skill in the art. The thin core can enable access to large evanescent optical fields 110, which can be useful for sensing. The shallow rib 115 can allow for relatively large lateral feature sizes (width≥λ), so that the structures can have a large fabrication tolerance.

Figure 2A:
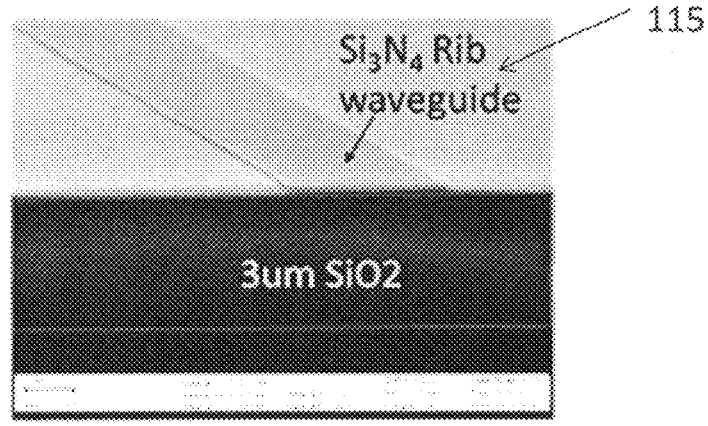
FIG. 2a shows a fabricated waveguide with an air top cladding, in accordance with an exemplary embodiment of the invention.
Figure 2B:
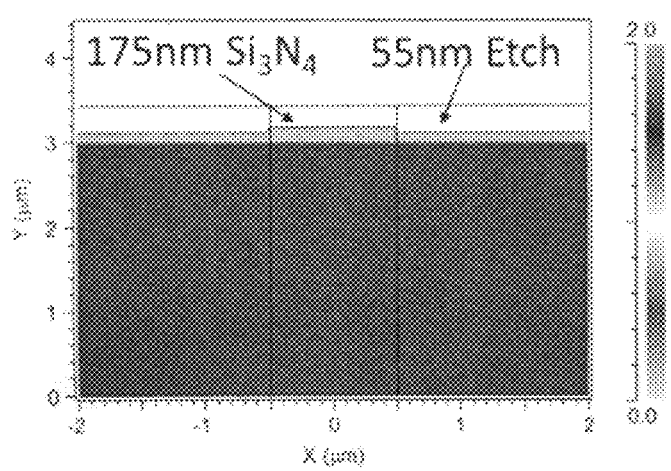
FIG. 2b is a waveguide mode simulation showing evanescent field with an air top cladding, in accordance with an exemplary embodiment of the invention.
Figure 2B:
Figure 2B:
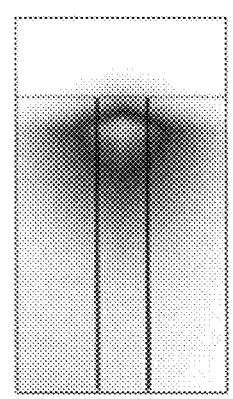
Figure 2C:
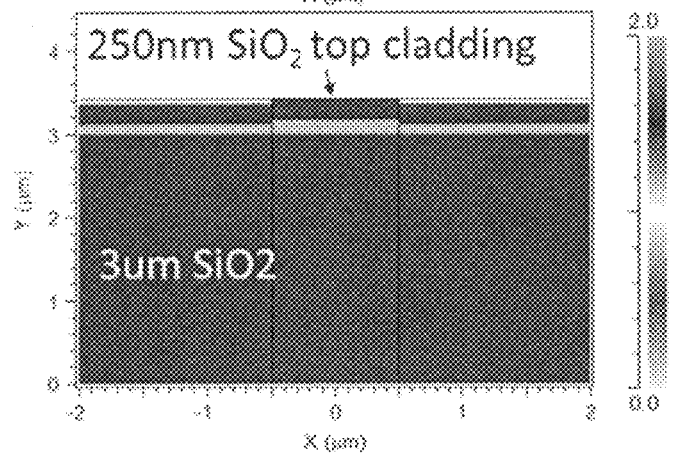
FIG. 2c is a waveguide mode simulation showing evanescent field with a 250 nm $SiO_2$ top cladding, in accordance with an exemplary embodiment of the invention.
Figure 2C:
Figure 2C:
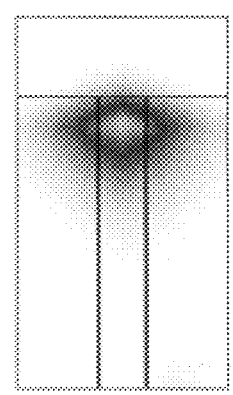

FIG. 2a shows a fabricated waveguide with an air top cladding, in accordance with an exemplary embodiment of the invention. The effect of the cladding material can have a strong effect on the light propagation in these structures. FIG. 2b is a waveguide mode simulation showing evanescent field with an air top cladding, in accordance with an exemplary embodiment of the invention. When simulating the effective index of a $W_{Rib}$=1.0 μm wide waveguide, the results obtained include $n_{Eff}$=1.464 (with an air top cladding), at λ=1460 nm, as shown in FIG. 2b. FIG. 2c is a waveguide mode simulation showing evanescent field with a 250 nm $SiO_2$ top cladding, in accordance with an exemplary embodiment of the invention. When simulating the effective index of a $W_{Rib}$=1.0 μm wide waveguide, the results obtained include $n_{Eff}$=1.519 (with a 250 nm $SiO_2$ top cladding), at λ=1460 nm, as shown in FIG. 2c. Clearly, the low optical confinement in these waveguides makes them highly sensitive to the top cladding material.

In an exemplary embodiment of the invention, a movable dielectric perturber 105, which is suspended above rib waveguide 115 (thereby leaving a gap between the waveguide and the perturber), can interact with the evanescent optical field 110. The movable perturber 105 can have a refractive index greater than 1, and can have an effective index smaller than the effective index of the waveguide 115.

Figure 3A:
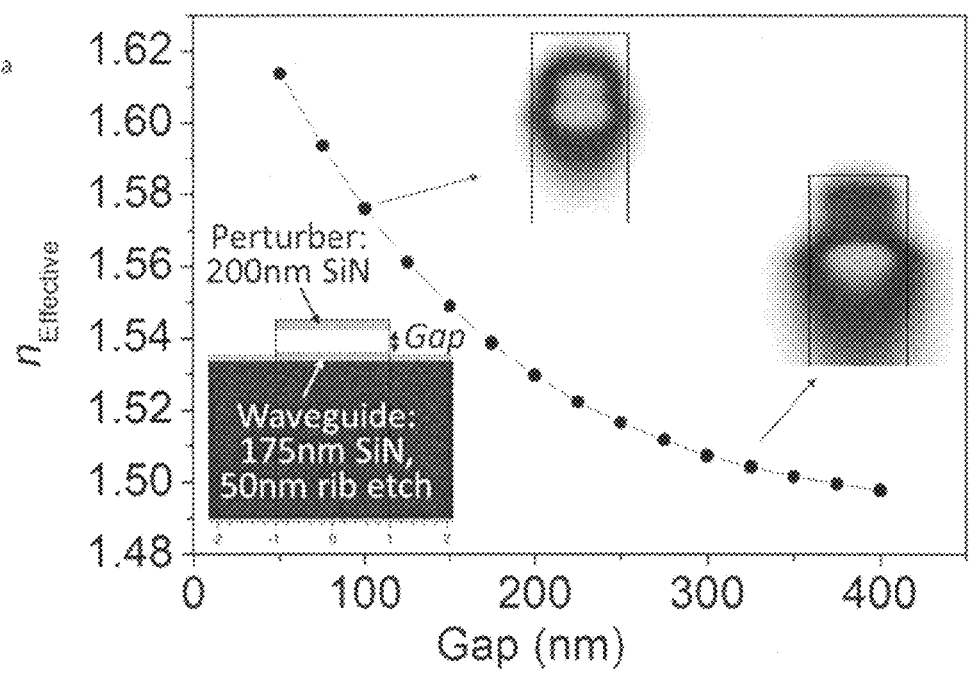
FIG. 3a is a graph representing a simulated waveguide $n_{Eff}$ vs. $Si_3N_4$ perturber position, in accordance with an exemplary embodiment of the invention.
Figure 3B:
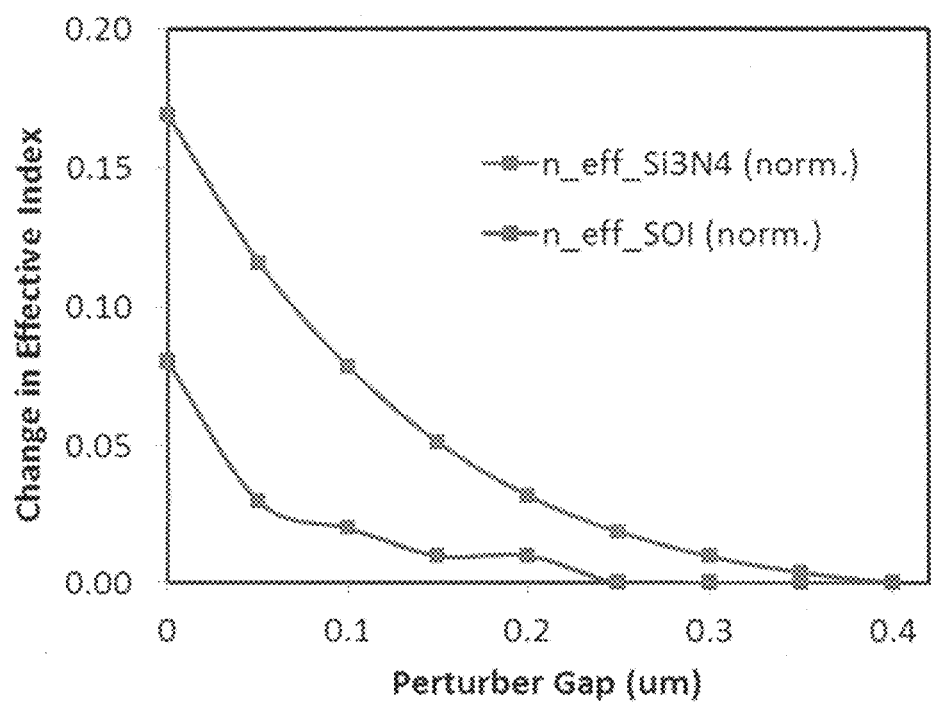
FIG. 3b is a graph representing a change in $n_{Eff}$ for $Si_3N_4$ and silicon-on-insulator (SOI) waveguide, in accordance with an exemplary embodiment of the invention.

More specifically, the waveguide 115 can be modified with the movable dielectric perturber 105, or perturber membrane. The perturber membrane 105 can be a 200 nm thick $Si_3N_4$ membrane. Additionally, the perturber can be dielectric, and optically transparent. The optical field in the waveguide decays exponentially away from the waveguide surface so that there is a strong dependence of $n_{Eff}$ on the waveguide-to-perturber gap; therefore, the perturber 105 can act as a high-resolution displacement sensor. FIG. 3a is a graph representing a simulated waveguide $n_{Eff}$ vs. $Si_3N_4$ perturber position, in accordance with an exemplary embodiment of the invention. The simulations in FIG. 3a confirms this strong dependence and suggest that this structure can act as a high-displacement sensor. FIG. 3b is a graph representing a change in $n_{Eff}$ for $Si_3N_4$ and silicon-on-insulator (SOI) waveguide, in accordance with an exemplary embodiment of the invention. FIG. 3b shows that the $Si_3N_4$ waveguide exhibits a larger change in $n_{Eff}$. Therefore, one of ordinary skill in the art will recognize that a silicon-on-insulator waveguide can be used instead of $Si_3N_4$; however, the $Si_3N_4$ waveguide is superior because it exhibits a larger change in $n_{Eff}$ versus the perturber position. This is a direct consequence of the larger evanescent field 110 in the low mode confinement $Si_3N_4$ waveguide compared to the state of the art.

Finally, an integrated optical readout circuit 125 can enable measurement of the waveguide effective index (which translates into an optical phase shift), which varies as the perturber 105 interacts with the evanescent field 110. More specifically, the integrated optical readout circuit 125 can convert the optical phase shift into an intensity modulation. The intensity modulation can correspond to a change in the position of the perturber.

One of ordinary skill in the art will recognize that there are several methods by which the effective index ($n_{Eff}$) can be measured. Interferometry techniques commonly utilize optical cavities (e.g. linear Fabry-Perot or circular microring) and give high sensitivity, although they are narrow-band optically and hence are highly temperature sensitive. Another approach is to use a Mach-Zehnder interferometer (MZI), which has a broadband optical response and is less temperature sensitive. A directional coupler readout circuit can also be utilized.

Figure 4A:
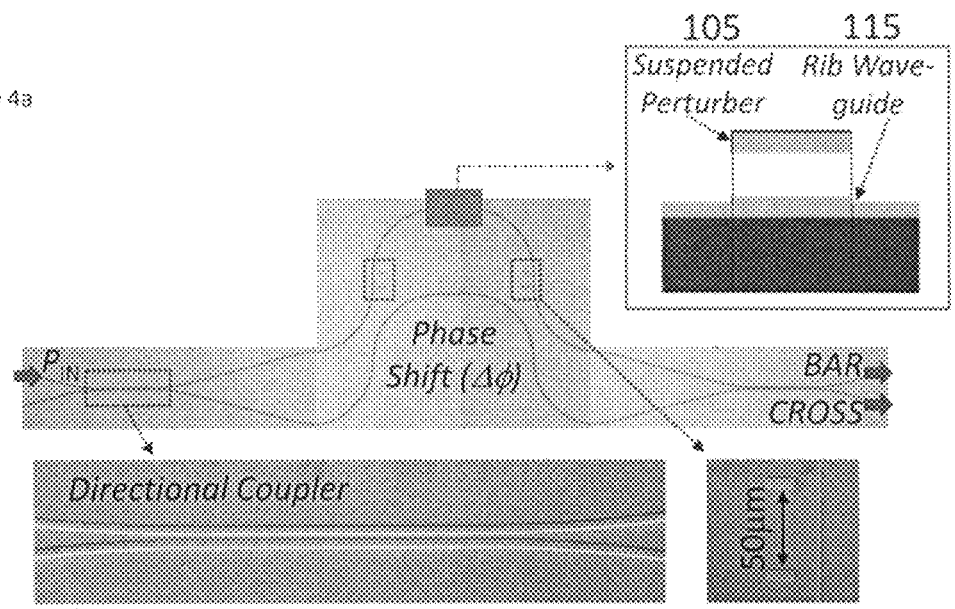
FIG. 4a is a fabricated asymmetric Mach-Zehnder interferometer (MZI), in accordance with an exemplary embodiment of the invention.
Figure 4B:
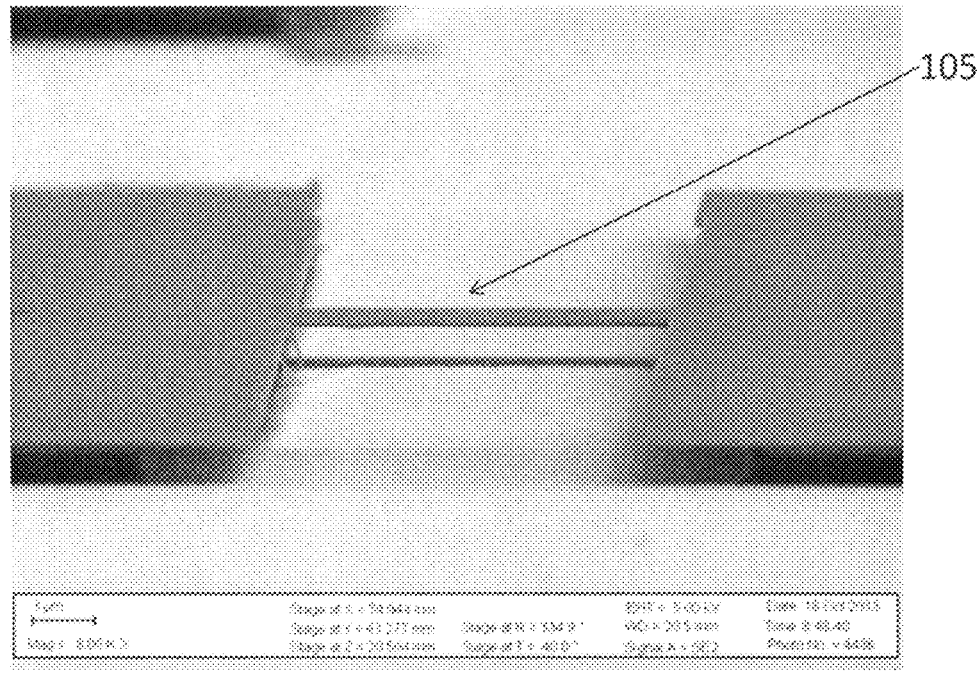
FIG. 4b is a scanning electron microscope (SEM) image of a fabricated suspended $Si_3N_4$ microbridge perturber, in accordance with an exemplary embodiment of the invention.

FIG. 4a is a fabricated asymmetric Mach-Zehnder interferometer (MZI), in accordance with an exemplary embodiment of the invention. The inset in FIG. 4a represents an illustration of a perturber suspended above one MZI arm, in accordance with an exemplary embodiment of the invention. The fabricated asymmetric MZI 125 can feature a 1-μm wide rib waveguides, and can utilize directional couplers as optical power splitters/combiners. The directional couplers can have a coupling length LDC=100 μm, and a coupling gap=2.0 μm to realize 3-dB power splitting. The built-in phase shift can result from two additional waveguide sections in one of the two MZI arms (total ΔL=100 μm). As before, processing can be simple, and the structure can be realized with a single optical contact lithography step followed by a shallow etch to define the rib waveguides. A suspended $Si_3N_4$ dielectric perturber 105 can be fabricated above one arm of the MZI 125, and any change in the perturber 105 position can then be measured as a phase shift in the MZI 125. FIG. 4b is a scanning electron microscope (SEM) image of a fabricated suspended Si3N4 microbridge perturber, in accordance with an exemplary embodiment of the invention.

As noted, in an alternative exemplary embodiment, an optical cavity readout circuit can be utilized. The optical cavity, e.g. a microring resonator, or, alternatively, a linear Fabry-Perot cavity, can be an alternative to an asymmetric MZI. In this approach, the relative position of the perturber can modify the microring's effective index. The result can be a tuning of the cavity optical resonances. The total resonance wavelength shift is typically modest due to the limited optical interaction length between the microring cavity and the perturber. Nonetheless, the optical cavities can provide an alternative readout circuit for measuring displacements of a perturber. It should be noted, however, that the narrow resonance line width makes this approach optically narrow-band. Although $Si_3N_4$ has a thermo-optic coefficient roughly 10-times smaller than silicon, any temperature variation can affect the performance of this readout approach.

An alternative optical readout circuit that can also be utilized is a directional coupler. A directional coupler is a four-port waveguide device in which light can couple from one waveguide to the adjacent one. The amount of light that is transferred depends on the coupling strength (i.e. waveguide separation) as well as the interaction length (i.e. the length over which the two waveguides are parallel and in close proximity to each other). The directional coupler can form an alternative optical readout circuit and that the coupling between the two waveguides is strongly affected by the relative position of the perturber. This can be explained by the increase in waveguide effective index in the presence of a perturber. The larger $n_{Effective}$ implies a larger interaction length in the directional coupler, which translates into stronger optical coupling and a shift in the coupler spectrum.

In an exemplary embodiment of the invention, all the components of the displacement sensor system can be fabricated on a common substrate using integrated circuit batch fabrication techniques. Furthermore, wherein multiple sensor systems are fabricated, they can be interconnected on a common substrate to form a sensor array. Therefore, this type of sensor system can be fabricated in large quantity, inexpensively, and can be scaled up to include many sensors within a single enclosure.

In an exemplary embodiment of the invention, light from a tunable laser source can be coupled to the sensor using commercially available lensed fibers. The laser wavelength can be swept and the transmitted signal in the BAR and CROSS outputs can be measured using a photodetector. Specifically, a TE-polarization (i.e., horizontal polarization) can be used for measurements to determine the effectiveness of the integrated waveguide displacement sensor 100.

In analyzing the MZI readout of an integrated waveguide displacement sensor 100 with top air cladding, the measured CROSS output can show a wavelength intensity response that follows $$I(\lambda)=A_0*[1+\cos(2\pi n_{Eff}\Delta L/\lambda)] \quad (3)$$

as expected. The BAR output can exhibit a complementary response to the CROSS output. The fringe spacing, or free-spectral range, can be FSR=12.5 nm near $\lambda$=1460 nm and can increase with wavelength. In experimentation, good agreement between experiment and calculation using $n_{Eff}$=1.465 was found. Compared to the theoretical response the transmittance drops at longer wavelengths. The low mode confinement waveguides result in the desired large evanescent field 110 at the surface, but they also have a large evanescent field that penetrates into the lower SiO2 cladding and silicon substrate; the leakage increases with wavelength.

In analyzing the MZI readout of an integrated waveguide displacement sensor 100 with a 250 nm thick top SiO2 cladding (instead of top air cladding), the measured CROSS spectrum differs in several respects compared to the air-cladding MZI. In this configuration, the fringes are now spaced closer together with FSR=12.0 nm near $\lambda$=1460 nm. The extracted waveguide effective index has increased to $n_{Eff}$=1.520, consistent with a large evanescent field overlap with the top SiO2 cladding. Secondly, the transmittance at longer wavelengths shows much lower loss compared to the air cladding device. This results from the fact that the SiO2 top cladding pulls the mode up and thereby reduces substrate leakage. Accordingly, in an exemplary embodiment of the invention, a good compromise is to utilize an SiO2 top cladding for waveguides on-chip, but to use an air cladding for any sensing regions in which access to the evanescent optical field is required. Alternatively, a thicker (>3,000 nm) thermal buried-SiO2 layer can be used.

Further analyzing the exemplary integrated waveguide displacement sensor 100, the MZI response in the presence of a localized dielectric perturbation 105 can be measured. For this analysis, an air cladding MZI device 125 can be utilized, and a standard SMF-28 optical fiber (n≈1.47) can be tapered to a minimum diameter of ≈8 µm using a commercial splicing system. The fiber taper can then be mounted onto a voltage controlled XYZ-micro-positioner, and the tapered fiber can act as an optical perturber and induce a phase shift due to the increase in $n_{EFF}$, similar to the $Si_3N_4$ perturber membrane structure previously disclosed. When analyzing several CROSS output spectra taken with the fiber perturber placed at different locations along one arm of the MZI, it is clearly apparent the fringes are shifted in the presence of the fiber taper, which indicates an induced phase shift. During analysis, a large change in the FSR is not observed, although calculations show that small phase changes can shift the fringes significantly while only minimally affecting their spacing (FSR). The precise interaction length between the fiber and waveguide can be difficult to ascertain, which makes it challenging to extract a $\Delta n_{EFF}$ as induced by the fiber taper. Nonetheless, the fringe shift in implies a substantial phase shift of the order of $\Delta\phi=2\pi(\Delta n_{Eff}L_{Interaction})/\lambda\sim\pi$.

Finally, an analysis can be conducted to fix the probe wavelength to a region where the CROSS signal exhibits a maximum change in transmittance, i.e. when the MZI transmittance drops to 50%. The fiber perturber is manually aligned with one arm of the MZI to induce a phase shift. The perturber is then raised up from the MZI and an automated program is used to step the actuators to lower the fiber back towards the MZI. The theoretical minimum actuator displacement can be $\Delta z$=20 nm. At each actuation step, the CROSS signal can be measured. In one example, a CROSS measurement taken at a probe wavelength $\lambda$=1471.1 nm. The measurements can imply a high sensitivity with displacements $\Delta z$<<20 nm (the minimum actuator step size) resulting in a sufficient phase shift and hence a measurable change in MZI transmittance (actuator position 3,750 nm-3,850 nm). Even smaller displacement sensitivity (potentially sub-nanometer-level) can be expected by increasing the optical interaction length between the perturber and the on-chip waveguide, since any displacement would then result in a larger phase shift via $\Delta n_{Eff}L_{Interaction}$.

Next, the measurement can be repeated at $\lambda_1$=1446.9 nm and $\lambda_2$=1453.0 nm, and the measurements can be taken consecutively without changing the fiber's lateral position. The data clearly show that the change in the CROSS signal results from an induced phase shift, and not simply an induced loss, since the measurements at $\lambda_1$ and $\lambda_2$ are complementary. Although the fiber perturber's position is not independently measured, the actuator position gives a good estimate of the fiber's relative displacement.

In an exemplary embodiment of the invention, the perturber can be configured to be displaced in a variety of different ways; therefore, allowing the displacement sensor system 100 to be used in a variety of different application. For example, in the most basic scenario, the perturber displacement is caused by an external force acting on the perturber.

In an alternative exemplary embodiment of the invention, the displacement sensor system 100 can act as an accelerometer. In this embodiment, the displacement sensor could include a proof-mass as part of the perturber. Any acceleration will displace the proof mass, and the displacement can be monitored optically. Optical forces can be used to dampen any thermal-mechanical oscillation and noise, thereby increasing sensitivity.

In an alternative exemplary embodiment of the invention, the displacement sensor system 100 can act as a pressure sensor. In this embodiment, the perturber can act as a membrane that deforms under pressure changes; therefore, it can function as a pressure sensor. Alternatively, the membrane could be used to detect sound waves, either in air (microphone) or in water (hydrophone). These sensors would be completely passive and the only required connection could be an optical fiber for sending laser light to the sensor and for detecting a change in transmittance.

In an alternative exemplary embodiment of the invention, the displacement sensor system 100 can act as a magnetic field sensor. In this embodiment, the perturber can be coated with a thin-film magnetic material. Alternatively, the perturber can be coated with a thin metal film and current can be passed through it. The presence or change in an external magnetic field can displace the perturber, and the displacement can be read out using the evanescent field sensor.

In an alternative exemplary embodiment of the invention, the displacement sensor system 100 can act as a bolometer. In this embodiment, the local heating of the perturber can cause thermal expansion and bending. The perturber can be coated with a thin absorbing material to enhance heating. The heating-induced bending can then be measured as a displacement and a resulting change in waveguide effective index. A bolometric array can be realized by utilizing multiple microring resonators that can be placed along the length of the waveguide such that each ring has a unique optical resonance wavelength. Each microring can then be able to measure the displacement of an optical perturber membrane placed over each ring. The input laser wavelength can be tuned sequentially to each microring's resonance to measure the displacement at each pixel. Alternatively, multiple laser wavelengths can be used simultaneously in a manner similar to wavelength-division-multiplexing.

In an alternative exemplary embodiment of the invention, the displacement sensor system 100 can used for chemical sensing, specifically, photothermal spectroscopy. The approach used for photothermal spectroscopy is similar to the bolometer application. In these types of chemical sensors, the absorption of IR-radiation is dependent on the presence of chemical analytes. That is, specific chemicals have a unique absorption spectrum or signature. Any absorbed light can cause local heating and displacement of coated bi-morph membrane or microbridge. This deflection can be monitored using the displacement sensor. This approach can enable the use of optical waveguides to interconnect many sensors using a single optical input/output.

Finally, in an alternative exemplary embodiment of the invention, the displacement sensor system 100 can act as an electric field sensor. In this embodiment, the perturber can be coated with a conductive material and the perturber displacement can be caused by an external electric field.

As previously described herein, the integrated waveguide displacement sensor system 100 can act as a "passive" sensor. That is, the displacement sensor 100 can be configured to measure small displacements by measuring optical phase shift. In an alternative exemplary embodiment of the invention, active displacement can be utilized to induce a desired optical phase shift.

Specifically, an etched waveguide can receive and propagate a laser light signal. The etched waveguide, can be configured to enable an evanescent optical field above the waveguide surface. A movable perturber can be positioned so the perturber interacts with the evanescent optical field above the waveguide surface. The perturber 105 can then be actively actuated by using an on-chip actuation mechanism to induce an optical phase shift in the waveguide. Finally, the induced optical phase shift can be used to achieve an optical delay.

In an exemplary embodiment of the invention, this active displacement method can allow the displacement sensor system to act as a continuously-variable optical phase shifter and optical time delay line. This can occur if the as the actuation mechanism can continuously modify the perturber position. The active displacement of the perturber can enable large changes in optical phase shifts and delays.

Figure 5A:
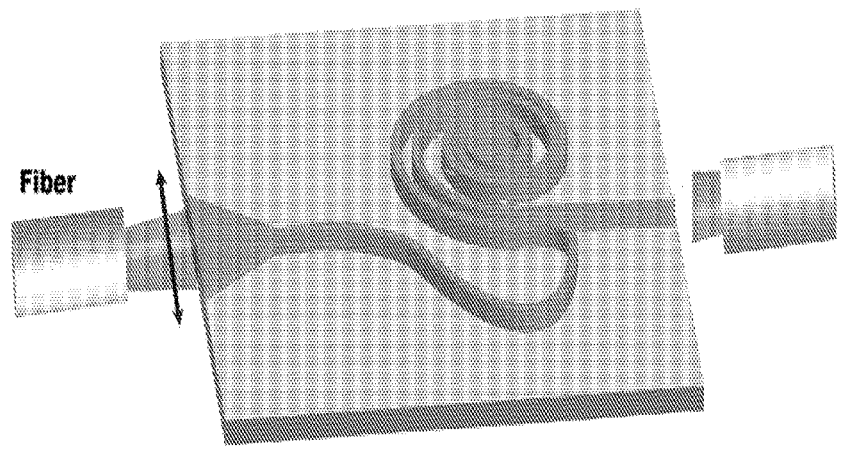
FIG. 5a is an illustration of a long waveguide segment as a nested spiral segment, in accordance with an exemplary embodiment of the invention.
Figure 5B:
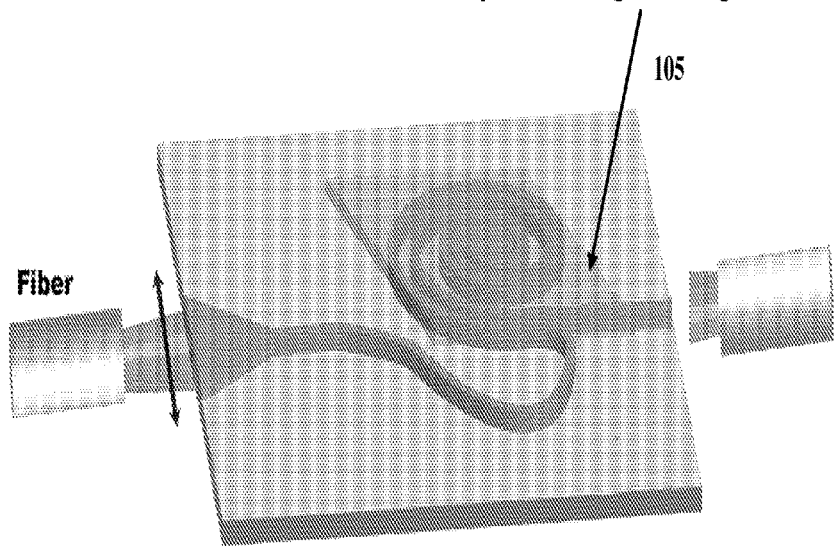
FIG. 5b is an illustration of a perturber interacting with the entire long waveguide segment, in accordance with an exemplary embodiment of the invention.

Furthermore, the waveguide can be configured to include a long segment that can create longer optical delays. For example, the long segment, or long optical path length, can be either a straight or a nested spiral segment in order to achieve large tunable optical time delays. FIG. 5a is an illustration of a long waveguide segment as a nested spiral segment, in accordance with an exemplary embodiment of the invention. FIG. 5b is an illustration of a perturber interacting with the entire long waveguide segment, in accordance with an exemplary embodiment of the invention. In FIG. 5b, as the perturber interacts with the entire waveguide segment, even larger optical delays and larger tuneability can be realized.

In an exemplary embodiment of the invention, multiple examples of on-chip actuation mechanisms can be utilized. Specific examples of on-chip actuation mechanisms can include (1) electro-thermal actuation; (2) electro-static actuation; (3) piezo-actuation; and (4) magnetic actuation. Electro-thermal actuation can be utilized by passing current through a thin metal film on top of the perturber 105. Localized heating can lead to thermal expansion and bending (displacement) of the perturber 105. Electro-static actuation can be utilized by applying a voltage between two metal layers, one on top of the perturber membrane and one on the underlying substrate, and the resulting electro-static force can displaces the perturber. In piezo-actuation, the perturber 105 can be coated with a piezo material, and the application of an electric field across the piezo-electric material can result in beam bending. Finally, in magnetic actuation, the perturber 105 can be coated with a magnetic material, and the application of an external magnetic field can result in beam bending.

Figure 6A:
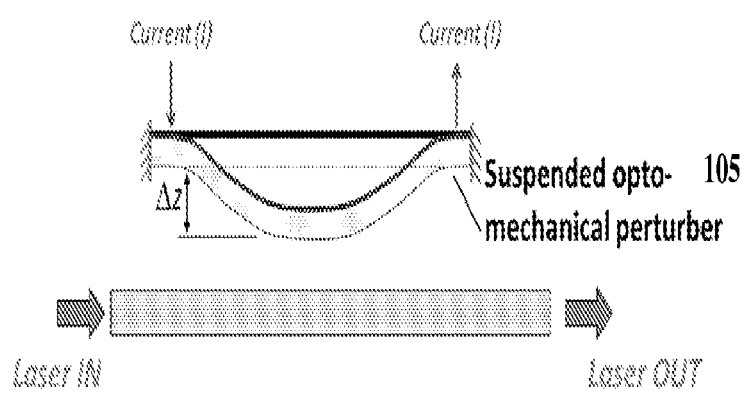
FIG. 6a is side-view of an on-chip actuation of perturber membrane to induce an optical phase shift in a waveguide, in accordance with an exemplary embodiment of the invention.
Figure 6B:
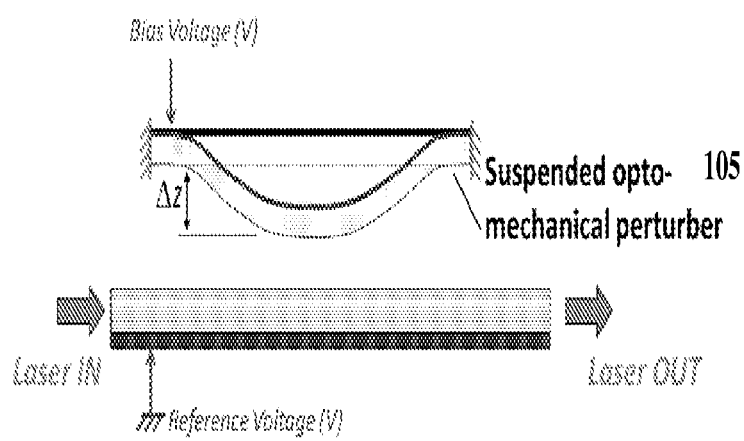
FIG. 6b is side-view of an on-chip actuation of perturber membrane to induce an optical phase shift in a waveguide, in accordance with an exemplary embodiment of the invention.

FIG. 6a is side-view of an on-chip actuation of perturber membrane to induce an optical phase shift in a waveguide, in accordance with an exemplary embodiment of the invention. Specifically, FIG. 6a represents an electro-thermal actuation by passing a current through a thin conducting layer. FIG. 6b is side-view of an on-chip actuation of perturber membrane to induce an optical phase shift in a waveguide, in accordance with an exemplary embodiment of the invention. Specifically, FIG. 6b represents an electro-static actuation by applying a bias voltage across two conducting layers, one layer that is fixed and the other layer on the surface of the suspended mechanical perturber.

In an exemplary embodiment, the present invention provides many advantages and features over the prior art devices. For example, the device enables on-chip optical detection of nanometer-level displacements without a cavity. Compared to previous approaches that utilize vertical cavities, the evanescent waveguides in an exemplary embodiment of the invention enable the integration of many sensors on a chip. The sensors can be interrogated using a single optical input/output. Each sensor can have a unique asymmetric MZI design so that individual MZI's can be monitored simply by tuning the laser to a particular wavelength at which the MZI shows a maximum response. Alternatively, microring resonator cavities can be used as the wavelength-selective sensing element, and either approach enables wavelength-division multiplexed sensor arrays.

In an exemplary embodiment of the invention, the low mode confinement waveguide technology platform is low cost and robust with simple fabrication. The waveguide can be formed from a thin dielectric layer of $Si_3N_4$ (thickness $t \approx \lambda/5$, although $t \ll \lambda/5$ is readily achievable) deposited onto a thermally oxidized silicon wafer. Thermally-oxidized wafers are typically inexpensive, and the $Si_3N_4$ layer can be obtained using a common deposition tool that enables nanometer precision in film thickness. The waveguides can be fabricated by etching 55 nm deep ribs on a 175 nm thick $Si_3N_4$ layer. This design can enable relatively large lateral features (width≥1 µm) while enabling nanoscale vertical features (thickness=175 nm) that give rise to large evanescent optical fields. The large lateral features can simplify fabrication by increasing feature size tolerances.

In contrast, similar waveguides using silicon typically give rise to a much smaller evanescent field due to silicon's larger refractive index; and, therefore, give lower displacement sensitivity. Furthermore, thin silicon-on-insulator wafers (i.e. 175 nm thick silicon with 1 µm buried $SiO_2$) are typically expensive compared to deposited $Si_3N_4$ material on standard thermally-oxidized wafers. Finally, silicon's large refractive index typically requires smaller feature sizes for single-mode operation, which increases the fabrication complexity, and decreases tolerances thereby increasing cost.

In an exemplary embodiment of the invention, the displacement sensor based on an asymmetric-MZI optical readout circuit does not require an optical cavity. Therefore, the sensor is optically broadband. The waveguide technology also has advantages in terms of temperature sensitivity. Silicon nitride ($Si_3N_4$) and thermal oxide ($SiO_2$) are a factor of approximately ten times less temperature sensitive than silicon (thermo-optic coefficient $dn/dT \approx 10^{-5}/°$ C. for $Si_3N_4$ and $SiO_2$ compared to $dn/dT \approx 10^{-4}/°$ C. for silicon). Consequently, the waveguides in the present invention are more suitable for field settings, in which the environmental conditions and temperature is more difficult to control than in a lab.

In an exemplary embodiment of the invention, measurements show nanometer-level displacement sensitivity. However, the true interaction length ($L_{Interaction}$) between the tapered fiber perturber and the MZI waveguide is difficult to ascertain and is likely to be small. Using a fully-integrated perturber membrane, it can be possible to precisely define the $L_{Interaction}$ and thereby increase the displacement sensitivity since the total phase shift increases with $L_{Interaction}$. Specifically, calculations can show that displacements of the order of tens of picometers can be measured in an exemplary embodiment of the invention (potentially sub-picometer level for longer $L_{Interaction}$ or smaller perturber gap).

For prior art sensors, cantilever waveguides generally have a displacement sensitivity of the order of picometers/$Hz^{1/2}$ and optical cavities (Fabry-Perot) can have sub-femtometers/$Hz^{1/2}$ sensitivity. However, these are for oscillating displacements measured at specific mechanical resonance conditions. In contrast, the calculation described above for the present invention assumes a steady state measurement. Operating at a mechanical resonance of the dielectric optical perturber, it is expected that the displacement sensitivity of the present invention should increase by several orders of magnitude, i.e. potentially sub-picometer/$Hz^{1/2}$-range; therefore, giving comparable sensitivity to the prior art sensors.

In an alternative embodiment, measurements can also be performed on the BAR and CROSS outputs simultaneously. In this manner, it can be possible to achieve balanced detection by measuring both outputs and subtracting them (noise is common-mode, while BAR and CROSS are complementary). This can cancel any sources of common mode noise and can increase the measurement sensitivity.

In an exemplary embodiment of the invention, the sensor design can enable the de-coupling of the optical and mechanical designs. The optical readout circuit can be formed by the shallow rib $Si_3N_4$ waveguides, while the mechanical structure can be formed from a second $Si_3N_4$ structural layer that can be suspended above the waveguide layer. Two key advantages of this approach can include: (1) the mechanical structure and its properties can be tailored independently of the optical layer (i.e. intrinsic stress, layer thickness/geometry, spring constant, etc.); and (2) the optical readout circuit (asymmetric MZI) does not require a cavity and hence is fairly tolerant of any optical losses induced by the mechanical structure, which acts as an optical dielectric perturber. These two features imply that the displacement sensor has a large opto-mechanical degree of freedom while exhibiting a large fabrication tolerance.

Finally, in an exemplary embodiment of the invention, silicon nitride ($Si_3N_4$) waveguides can exhibit low loss that is 10-100 times lower than silicon waveguides (i.e. loss≈0.01 dB/cm range compared to loss≈1 dB/cm range for silicon). Another advantage of $Si_3N_4$ waveguides can be their transparency over large wavelengths ranging from the visible to near-IR. In contrast, silicon is only transparent at wavelengths $\lambda > 1.1$ μm, which may limit the application areas of silicon-based waveguides.

Portions of the invention can comprise a computer program that embodies the functions described herein. Specifically, a measurement module, implemented in a LabVIEW® program, can automatically scan the laser light and measure the device response. An analysis module, which can be implemented in the same or different LabVIEW® program, can be used to analyze the measured data and to extract the sensor system response (e.g. group index). From the group index, the relative displacement can be found. The measurement module and analysis module can be separate modules that can be implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an exemplary embodiment based on the figures and associated description in the application text. Therefore, disclosure of a particular set of program code instructions is not considered necessary for an adequate understanding of how to make and use the invention.

It should be understood that the foregoing relates only to illustrative embodiments of the present invention, and that numerous changes may be made therein without departing from the scope and spirit of the invention as defined by the following claims.

The invention claimed is:

1. A displacement sensor system, comprising:
   a waveguide core deposited on top of a lower cladding, wherein the waveguide core comprises an etched waveguide that is configured to receive and propagate light to enable an evanescent optical field above the waveguide surface, said waveguide core comprising a thickness less than a wavelength and an air top cladding; and
   a movable perturber suspended above the etched waveguide and positioned to interact with the evanescent optical field above the waveguide surface; wherein the perturber has an effective index smaller than the effective index of the waveguide, wherein the evanescent field interaction induces an optical phase shift when the movable perturber is displaced.

2. The sensor system of claim 1, further comprising an integrated optical readout circuit configured to measure the optical phase shift as the perturber interacts with the evanescent optical field.

3. The sensor system of claim 2, wherein the integrated optical readout circuit converts the optical phase shift into an intensity modulation, and wherein a change in intensity modulation corresponds to a change in the position of the perturber.

4. The sensor system of claim 2, wherein the integrated optical readout circuit comprises at least one of a Mach-Zehnder interferometer; an optical cavity; or a directional coupler.

5. The sensor system of claim 1, wherein the perturber has a refractive index greater than 1.

6. The sensor system of claim 1, wherein the perturber displacement is caused by an external force acting on the perturber.

7. The sensor system of claim 1, wherein the perturber is configured with a proof-mass, and the perturber displacement is caused by an acceleration.

8. The sensor system of claim 1, wherein the perturber is configured to act as a membrane that deforms under pressure, and the perturber displacement is caused by a change in pressure car a detection of sound waves.

9. The sensor system of claim 1, wherein the perturber is coated with a conductive material and the perturber displacement is caused by an external electric field.

10. The sensor system of claim 1, wherein the perturber is coated with a magnetic material and the perturber displacement is caused by an external magnetic field.

11. A method for sensing a displacement, comprising the steps of:
receiving and propagating a laser light signal with an etched waveguide that is configured to enable an evanescent optical field above the waveguide surface, the waveguide core comprising a thickness less than a wavelength and an air top cladding, the etched waveguide comprising a waveguide effective refractive index;
positioning a movable perturber so the perturber interacts with the evanescent optical field above the waveguide surface, wherein the perturber has a perturber effective refractive index smaller than the waveguide effective refractive index of the waveguide;
inducing an optical phase shift in the waveguide when the movable perturber is displaced in the evanescent optical field; and
measuring the optical phase shift.

12. The method of claim 11, further comprising the step of converting the optical phase shift into an intensity modulation by means of interferometry.

13. The method of claim 12, wherein the interferometry is achieved by one of a Mach-Zehnder interferometer; an optical cavity; or a directional coupler.

14. The method of claim 13, wherein measure ent of the phase shift enables the determination of the perturber displacement magnitude.

15. A displacement sensor system, comprising:
a waveguide core deposited on top of a lower cladding, said waveguide core comprising an etched waveguide, said etched waveguide comprising a waveguide surface and a waveguide effective refractive index, said etched waveguide being configured to receive and propagate light thereby enabling an evanescent optical field above the waveguide surface; and
a movable perturber suspended above the etched waveguide and positioned to interact with the evanescent optical field above the waveguide surface; wherein an evanescent field interaction induces an optical phase shift when the movable perturber is displaced, the perturber comprising a perturber effective refractive index smaller than the waveguide effective refractive index.

\* \* \* \* \*